(12) United States Patent
Marlin et al.

(10) Patent No.: US 10,963,920 B2
(45) Date of Patent: Mar. 30, 2021

(54) WEB PAGE VIEWERSHIP PREDICTION

(71) Applicant: Advance Magazine Publishers Inc., New York, NY (US)

(72) Inventors: Jason Marlin, Asheville, NC (US); Lee Aylward, Ann Arbor, MI (US); Kenneth R. Fisher, III, Winchester, MA (US)

(73) Assignee: Advance Magazine Publishers Inc., New York, NY (US)

( * ) Notice: Subject to any disclaimer, the term of this patent is extended or adjusted under 35 U.S.C. 154(b) by 255 days.

(21) Appl. No.: 15/922,133

(22) Filed: Mar. 15, 2018

(65) Prior Publication Data

US 2018/0204248 A1 Jul. 19, 2018

Related U.S. Application Data

(63) Continuation of application No. 14/584,773, filed on Dec. 29, 2014, now abandoned.

(51) Int. Cl.
*G06Q 30/02* (2012.01)
*H04L 29/08* (2006.01)

(52) U.S. Cl.
CPC ..... *G06Q 30/0269* (2013.01); *G06Q 30/0254* (2013.01); *H04L 67/02* (2013.01)

(58) Field of Classification Search
CPC ................................. G06Q 30/0207–30/0277
USPC ............................................. 705/14.1–14.73
See application file for complete search history.

(56) References Cited

U.S. PATENT DOCUMENTS

| | | |
|---|---|---|
| 6,281,986 B1 * | 8/2001 | Form ..................... G06F 16/54 358/403 |
| 6,839,681 B1 | 1/2005 | Hotz |
| 7,058,590 B2 | 6/2006 | Shan |
| 7,558,865 B2 | 7/2009 | Lin et al. |
| 8,296,253 B2 | 10/2012 | Huberman et al. |
| 8,504,912 B2 | 8/2013 | Giuffrida |

(Continued)

FOREIGN PATENT DOCUMENTS

| | | |
|---|---|---|
| JP | 2008059614 A | 3/2008 |
| KR | 100820257 B1 | 4/2008 |
| WO | 0158076 A2 | 8/2001 |

OTHER PUBLICATIONS

Method and System for Recommending Ads by Considering Entire Web Page Content An IP.com Prior Art Database Technical Disclosure Authors et. al.: Yiqun Li Mar. 1, 2013; pp. 1-2 (Year: 2013).*

(Continued)

*Primary Examiner* — Alexnadru Cirnu
(74) *Attorney, Agent, or Firm* — Withrow & Terranova, PLLC

(57) ABSTRACT

Mechanisms for dynamically integrating content with a web page are disclosed. Statistical data that identifies a plurality of metrics associated with viewership of a web page of a plurality of web pages on a web server is received. Based on the statistical data, the web page is predicted to meet a future viewership metric. Based on the prediction, the web page is identified as a web page predicted to meet the future viewership metric. A web page identifier that identifies the web page is received from a client device. The client device is provided with a high-viewership ad content descriptor from a plurality of ad content descriptors for use in conjunction with presenting the web page to a user.

13 Claims, 6 Drawing Sheets

(56) References Cited

U.S. PATENT DOCUMENTS

| | | |
|---|---|---|
| 8,521,813 B2 | 8/2013 | Black et al. |
| 8,543,453 B1 | 9/2013 | Calvert et al. |
| 8,600,809 B1 | 12/2013 | Kubica |
| 8,661,006 B1* | 2/2014 | Hill .................. G06F 16/10 707/705 |
| 9,164,979 B1 | 10/2015 | Dubey et al. |
| 2008/0294503 A1* | 11/2008 | Borislow ........... G06Q 30/0209 705/14.54 |
| 2009/0099904 A1 | 4/2009 | Afield et al. |
| 2009/0282327 A1* | 11/2009 | Hamilton, II ....... G06F 16/9577 715/231 |
| 2010/0070621 A1 | 3/2010 | Urdan et al. |
| 2010/0114954 A1 | 5/2010 | Sareen et al. |
| 2010/0241597 A1 | 9/2010 | Chen et al. |
| 2010/0299350 A1 | 11/2010 | Konig et al. |
| 2011/0252330 A1 | 10/2011 | Catlin et al. |
| 2011/0302103 A1 | 12/2011 | Carmel et al. |
| 2013/0291126 A1* | 10/2013 | Thomson ................. G06F 16/94 726/30 |
| 2013/3011408 | 11/2013 | Bagga et al. |
| 2014/0013265 A1 | 1/2014 | Goranka |
| 2014/0052812 A1* | 2/2014 | Ozawa ................ H04L 67/1095 709/213 |
| 2014/0108162 A1 | 4/2014 | Kumar et al. |
| 2015/0234912 A1* | 8/2015 | Gorman ................ G06F 16/285 707/737 |
| 2016/0189237 A1 | 6/2016 | Marlin et al. |

OTHER PUBLICATIONS

Bandari, Roja, "The Pulse of News in Social Media: Forecasting Popularity," Association for the Advancement of Artificial Intelligence, Feb. 2, 2012, 8 pages.

Lerman, Kristina, et al., "Using a Model of Social Dynamics to Predict Popularity of News," Proceedings of the 19th International World Wide Web Conference (WWW10), Apr. 29, 2010, 11 pages.

Szabo, Gabor, et al., "Predicting the popularity of online content," Communications of the ACM, vol. 53, Issue 8, Aug. 2010, 10 pages.

Non-Final Office Action for U.S. Appl. No. 141584,773, dated Jun. 23, 2017, 31 pages.

Final Office Action for U.S. Appl. No. 14/584,773, dated Dec. 15, 2017, 38 pages.

International Search Report and Written Opinion for International Patent Application No. PCT/US2015/067836, dated Apr. 27, 2016, 11 pages.

International Preliminary Report on Patentability for International Patent Application No. PCT/US2015/067836, dated Jul. 13, 2017, 8 pages.

* cited by examiner

US 10,963,920 B2

WEB PAGE VIEWERSHIP PREDICTION

RELATED APPLICATION

This application is a continuation of co-pending U.S. patent application Ser. No. 14/584,773, filed on Dec. 29, 2014, entitled "WEB PAGE VIEWERSHIP PREDICTION," which is hereby incorporated herein by reference in its entirety.

TECHNICAL FIELD

The embodiments relate generally to online publishing and, in particular, to predicting future viewership of a web page, and to altering content presented in conjunction with the web page based on the prediction.

BACKGROUND

Many online publishers rely heavily on advertising for revenue. Advertisers are willing to pay more to advertise in conjunction with a highly popular article than in conjunction with an unpopular article. It is possible, over time, to determine that an article is popular and to increase an advertising rate associated with the article. However, the sooner it can be determined that an article is popular, the sooner the advertising rates for the article can be appropriately increased, thereby increasing advertising revenue. Under alternative sales strategies, popular articles can be sold in bulk to advertisers ahead of time, resulting in a lower effective rate for the advertiser and a greater number of impressions.

SUMMARY

The embodiments relate to mechanisms for dynamically integrating content, such as an advertisement (ad), with a web page in response to a prediction regarding future viewership of the web page based on current viewership data associated with the web page.

In one embodiment, a method for dynamically integrating an ad with a web page is provided. Statistical data that identifies a plurality of metrics associated with viewership of a web page of a plurality of web pages on a web server is received. Based on the statistical data, the web page is predicted to meet a future viewership metric. Based on the prediction, the web page is identified as a web page predicted to meet the future viewership metric. A web page identifier that identifies the web page is received from a client device. The client device is provided with a high-viewership ad content descriptor from a plurality of ad content descriptors for use in conjunction with presenting the web page to a user.

In one embodiment, a high-viewership flag associated with the web page is set that identifies the web page as a web page predicted to meet the future viewership metric.

In one embodiment, iteratively over a period of time, the statistical data that identifies the plurality of metrics is requested from a statistics collection module to generate a plurality of statistical records associated with the web page.

In one embodiment, a rate of change of a statistical metric over time is determined based on the plurality of statistical records, and it is determined that the rate of change exceeds a rate-of-change threshold for the statistical metric. In one embodiment, the statistical metric comprises page views.

In one embodiment, the plurality of metrics comprise at least two of a rate of change of a page view count metric, a referring URL metric, a geo-location metric, a unique visitor metric, and a client device platform metric.

In another embodiment, a system is provided. The system includes a computing device that comprises a communications interface configured to communicate with a network and comprises a processor coupled to the communications interface. The processor is configured to receive statistical data that identifies a plurality of metrics associated with a viewership of a web page of a plurality of web pages on a web server. The processor is also configured to, based on the statistical data, predict that the web page will meet a future viewership metric. The processor is configured to, based on the prediction, identify the web page as a web page predicted to meet the future viewership metric. In one embodiment, the processor is configured to set a high-viewership flag associated with the web page that identifies the web page as a web page predicted to meet the future viewership metric. The processor is configured to receive, from a client device, a web page identifier that identifies the web page, and, based on the web page being identified as a web page predicted to meet the future viewership metric, provide to the client device a high-viewership ad content descriptor for use in conjunction with presenting the web page to a user.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first web page" and "second web page," and does not imply a priority, a type, an importance, or other attribute, unless otherwise stated herein.

The embodiments relate to mechanisms for dynamically integrating an advertisement (ad) with a web page in response to a prediction regarding future viewership of the web page based on current viewership data associated with the web page. While the embodiments are illustrated herein in the context of selecting ads to present in conjunction with a web page, the embodiments are not limited to advertising, and have applicability in any context where it is desirable to present additional content in conjunction with a web page based on predicted viewership of the web page.

Figure 1:
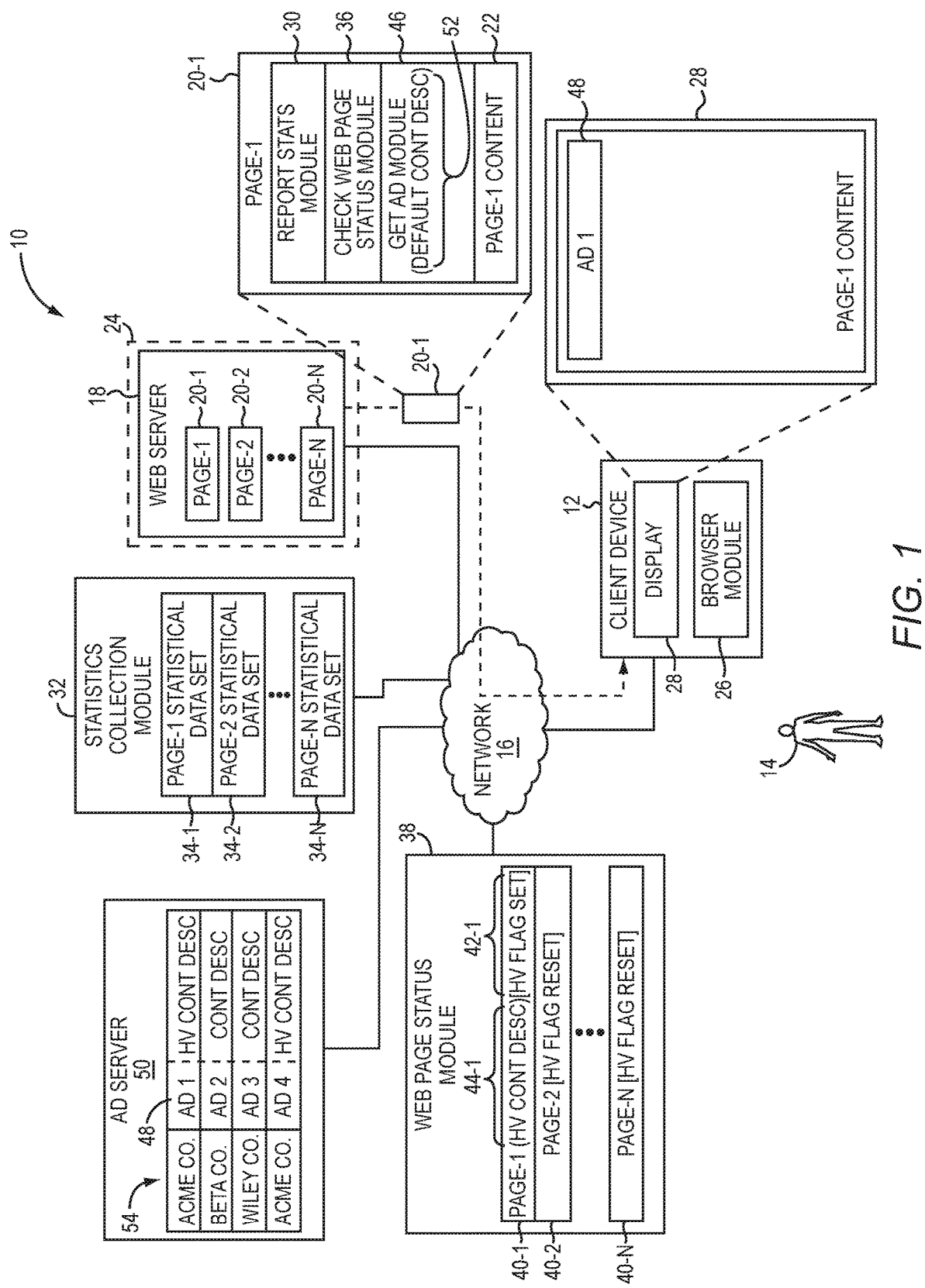
FIG. 1 is a block diagram of a system in which embodiments may be practiced.

FIG. 1 is a block diagram of a system 10 in which embodiments may be practiced. The system 10 includes one or more client devices 12, each of which is operated by a user 14. A client device 12 may comprise any device capable of interpreting a web page, such as a smart phone, computer tablet, laptop computer, desktop computer, or the like. The client device 12 is communicatively coupled to one or more other devices via a network 16. The network 16 may comprise any one or combination of private or public networks, including the Internet. The client device 12 may communicatively couple to the network 16 via any desired wired or wireless network technology, including, by way of non-limiting example, Ethernet, WiFi™, ZigBee®, Bluetooth®, or a wireless cellular technology.

Typically in response to input from the user 14, the client device 12 sends a request to a web server 18 for a web page 20-1. The request may include, by way of non-limiting example, a domain name, or an Internet Protocol (IP) address of the web page 20-1 and optionally a page identifier that identifies the specific web page 20-1. The web page 20-1 includes content 22 that comprises, or links to, substantive content associated with the web page 20-1. For example, the web server 18 may be owned by a publishing entity 24 that is in the news business, and the web page 20-1 may comprise a home page of a news web site associated with the publishing entity 24. The content 22 may comprise a mixture of links, text, and/or images that relate to relevant news events. The web page 20-1 may also include one or more additional modules, functions, or instructions that provide certain functionality when executed on the client device 12 and that are described in greater detail below. The web page 20-1 may be written in any desired language or languages, or combination thereof, including, by way of non-limiting example, HyperText Markup Language (HTML), JavaScript™, or Cascading Style Sheets (CSS).

The web page 20-1 is sent by the web server 18 to the client device 12 over the network 16. The client device 12 includes technology, such as a browser module 26, that is capable of interpreting the language or languages in which the web page 20-1 has been coded. In particular, upon receipt of the web page 20-1, the browser module 26 interprets the web page 20-1 to provide the functionality, on the client device 12, that is coded into the web page 20-1.

Among other things, the browser module 26 formats and displays the content 22 on a display 28 of the client device 12. In addition, the web page 20-1 includes, in one embodiment, a report statistics module 30 that collects or otherwise determines statistical data associated with the web page 20-1 while being viewed on the client device 12 by the user 14. The report statistics module 30 sends the statistical data to a statistics collection module 32. The statistics collection module 32 may be associated with the web server 18, or associated with another entity, and may be coupled to the client device 12 via the network 16. The statistical data can identify any desired metrics associated with viewership of the web page 20-1, including, by way of non-limiting example, an amount of time that the user 14 has hovered a cursor over various parts of the web page 20-1 when presented on the display 28, a total amount of time the user 14 has viewed the web page 20-1, a geographic location of the client device 12, the particular platform of the client device 12, such as a mobile or desktop platform, the number of social shares performed by the user 14, such as sharing the web page 20-1 via one or more predetermined social network interfaces, such as Facebook®, LinkedIn®, Twitter®, and the like. The report statistics module 30 may determine and provide such statistical data to the statistics collection module 32 without interruption of or direction from the user 14, and the report statistics module 30 may operate concurrently while the user 14 views the web page 20-1 on the display 28.

The statistics collection module 32 collects the statistical data from the report statistics module 30 and maintains the statistical data, along with other statistical data, in one or more statistical data sets 34. Notably, the client device 12 may be only one of hundreds, thousands, or more of client devices that request and receive the web page 20-1 from the web server 18. Each of such client devices may similarly execute the report statistics module 30 and provide relevant statistical data that identifies metrics associated with viewership of the web page 20-1 when viewed by a respective user on a respective client device. Thus, the statistics collection module 32 may be continually receiving statistical data relating to the web page 20-1, as well as to other web pages maintained by the web server 18, such as web pages 20-2-20-N, over time. The statistics collection module 32 may aggregate, summarize, or otherwise process the statistical data, and maintain such information in statistical data sets 34-1-34-N (generally, statistical data sets 34), respectively, for the web pages 20-1-20-N (generally, web pages 20). In some embodiments, the statistics collection module 32 may also obtain statistical data regarding the web pages 20 from the web server 18, such as, by way of non-limiting example, statistical data associated with the number of client devices that request a respective web page 20.

The web page 20-1 also includes, in one embodiment, a check web page status module 36. At some point after the browser module 26 loads the web page 20-1, the check web page status module 36 sends a message that includes a web page identifier that identifies the web page 20-1 to a web page status module 38. In response to the message, the web page status module 38 accesses a web page entry 40-1 which corresponds to the web page 20-1. The web page entry 40-1 includes a high-viewership (HV) flag 42-1 that indicates whether the web page 20-1 has been designated by the web page status module 38 as a HV web page. Mechanisms by which the web page status module 38 determines whether the web page 20-1 is a HV web page will be discussed in greater detail below.

If the HV flag 42-1 of the web page entry 40-1 is "set," then the HV flag 42-1 indicates that the web page 20-1 has been identified as a HV web page. Because the web page 20-1 has been identified as a HV web page, the web page status module 38 obtains a HV content descriptor 44-1 that is associated with the web page 20-1. In some embodiments, the HV content descriptor 44-1 may be stored in the web page entry 40-1. The HV content descriptor 44-1 may comprise one or more words, an alphanumeric string, or other data. The web page status module 38 sends the HV content descriptor 44-1 to the client device 12.

The web page 20-1 also includes one or more get ad modules 46 that facilitate the placement of ads, such as an ad 48, on the web page 20-1 when presented on the display 28. While for purposes of illustration, the web page 20-1 has been illustrated with only a single get ad module 46, a respective web page 20 may include any number of get ad modules 46, each of which corresponds to a different ad positioned at a different location on the display 28.

When executed by the browser module 26, the get ad module 46 sends an ad retrieval message to an ad server 50 requesting an ad for presentation on the display 28. By default, the web page 20-1 may have included one or more default content descriptors 52 for use by the ad server 50 in selecting a suitable ad. Such default content descriptors 52 may originate from any number of different mechanisms, including, by way of non-limiting example, default content descriptors provided by the author of the web page 20-1, or inferred from the root URL path of the web page 20-1. Typically, the ad retrieval message includes the default content descriptors 52. However, where, as in this example, the client device 12 has received the HV content descriptor 44-1, the ad retrieval message may include the HV content descriptor 44-1 in addition to the default content descriptors 52, or in lieu of the default content descriptors 52.

The ad server 50 operates to provide ads in response to ad retrieval messages based on the content descriptors contained in the ad retrieval messages. In one embodiment, the ad server 50 contains ad information 54 that correlates content descriptors to ads. For example, each ad may have associated keywords that may be used to match certain default content descriptors 52 to certain ads. In one embodiment, the ad server 50 may correlate a particular HV content descriptor 44 to a particular advertiser, such that only ads of that particular advertiser are sent when the particular HV content descriptor 44 is received. Thus, in this example, because the web page 20-1 has been flagged as a HV web page, any ad retrieval calls associated with the web page 20-1 will be provided with an ad of the Acme Company. In essence, other advertisers, such as the Beta Company and the Wiley Company, may be blocked from advertising on those web pages 20 that are designated as HV web pages. Thus, if three or four ads were displayed on the display 28 in conjunction with the web page 20-1, each ad may be from the Acme Company. In other embodiments, a particular HV content descriptor 44 may be used to select an ad from a subset of advertisers who have each agreed to pay higher rates to advertise in conjunction with those web pages 20 that are designated as HV web pages.

Assume for purposes of illustration that the ad server 50 selects the ad 48 of the Acme Company, based on the HV content descriptor 44-1 received from the client device 12. The ad server 50 sends the ad 48, or a reference to the ad 48, to the client device 12. The browser module 26 then displays the ad 48 on the display 28 in conjunction with the web page 20-1.

Figure 2:
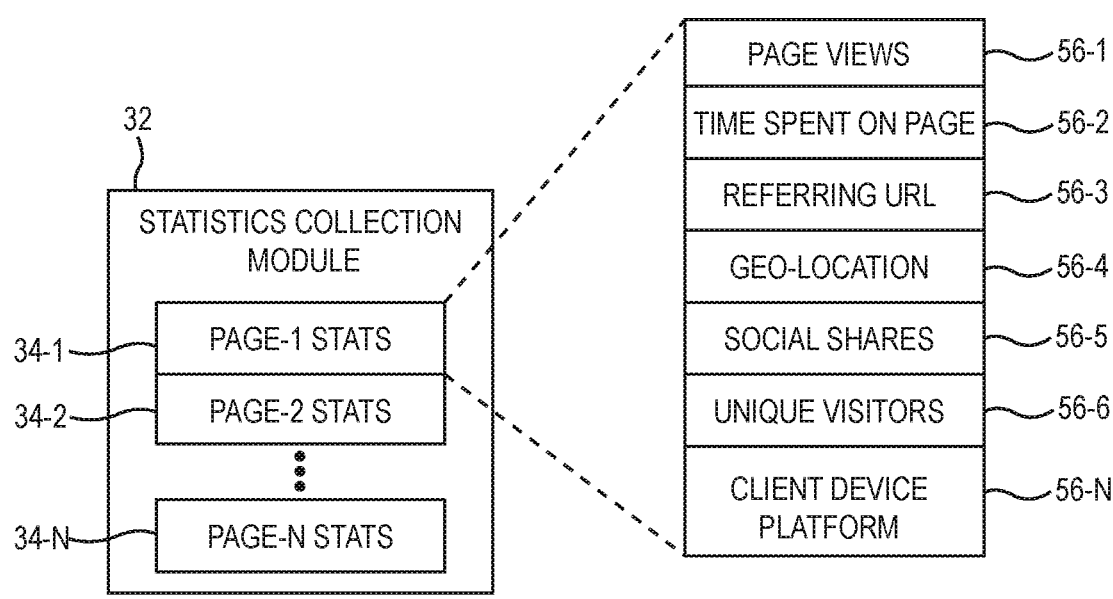
FIG. 2 is a block diagram of a statistics collection module according to one embodiment.

FIG. 2 is a block diagram of the statistics collection module 32 in greater detail according to one embodiment. The statistical data sets 34 may include any desired statistical data that may be utilized by the web page status module 38 to determine whether a web page 20 is a HV web page. In one embodiment, the statistical data set 34 may include a page view field 56-1 that identifies the number of users who have requested the web page 20 from the web server 18. The number of users who have requested the web page 20 may be obtained, for example, from the web server 18, or may be tracked based on statistical data gathered by the report statistics modules 30 when executing on respective browser modules 26 of those client devices 12 that have requested the web page 20-1.

A time spent on page field 56-2 may track how long the user 14 viewed the web page 20-1 before requesting a different web page 20. A referring uniform resource locator (URL) field 56-3 identifies a URL of the web page 20 that linked to the web page 20-1 and that resulted in the client device 12 requesting the web page 20-1. A geo-location field 56-4 identifies a geographic location of the client device 12, which may be obtained, for example, via an IP address of the client device 12, or from data obtained from the client device 12, such as GPS coordinates, or via triangulation techniques. A social shares field 56-5 identifies one or more social websites with which the user 14 has shared the web page 20-1. A unique visitors field 56-6 identifies a number of unique visitors who have visited the web page 20-1. A client device platform field 56-N identifies the client device 12 as a type of client device 12, such as a mobile device or a desktop device. While only a single statistical data set 34-1 is illustrated as corresponding to the web page 20-1, the statistics collection module 32 may maintain any number of statistical data sets 34-1 in association with the web page 20-1, such as one statistical data set 34-1 for each client device 12 that requests the web page 20-1.

Figure 3:
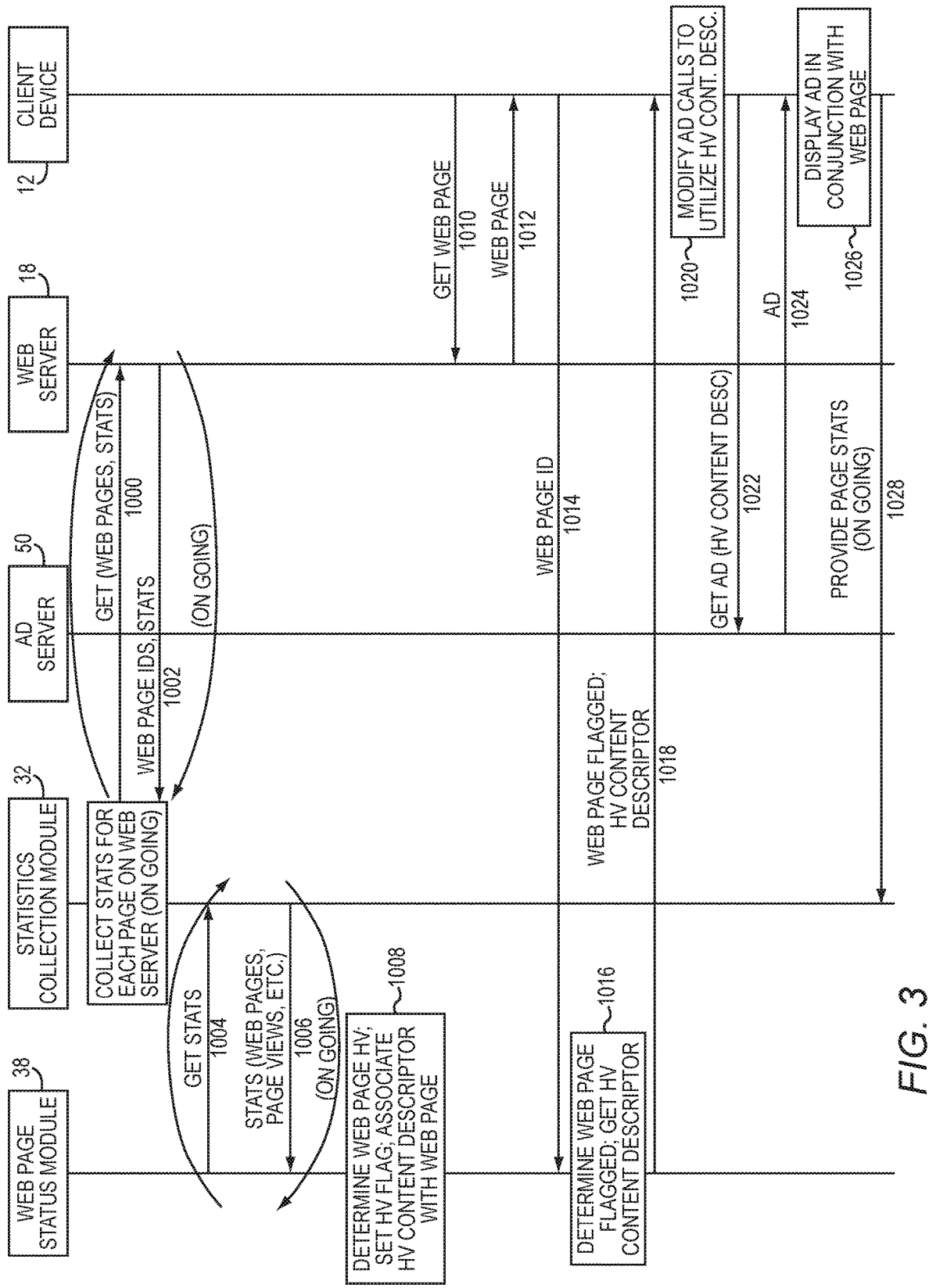
FIG. 3 is a message flow diagram that illustrates example messages communicated between various components of the system illustrated in FIG. 1 according to one embodiment.

FIG. 3 is a message flow diagram that illustrates example messages communicated between various components of the system 10 illustrated in FIG. 1, and example processing performed by such various components associated with the web page 20-1 as discussed above with regard to FIG. 1. The statistics collection module 32, on an ongoing basis, collects statistical data from the web server 18 regarding the web pages 20 (FIG. 3, steps 1000-1002). The information provided by the web server 18 may include, for example, web page identifiers that identify each web page 20 offered by the web server 18, and statistical data associated with such web pages 20. Such information may be requested periodically by the statistics collection module 32, such as every 10 seconds by way of non-limiting example, or may be provided periodically by the web server 18 without request from the statistics collection module 32.

The web page status module 38, on an on-going basis, retrieves statistical data from the statistics collection module 32 (FIG. 3, steps 1004-1006). The statistical data may comprise both web page identifiers that identify the web pages 20 offered by the web server 18 and the statistical data associated with viewership of the web pages 20, as discussed above. The web page status module 38 utilizes the statistical data to predict whether a respective web page 20 will, in the future, meet a future viewership metric. For example, in one embodiment, the web page status module 38 determines a rate of change at which the respective web page 20 is being viewed by multiple users 14. The rate of change may, for example, be based on the change in the number of page views over time. If the rate of change exceeds a predetermined threshold, the web page 20 may be predicted to meet the future viewership metric. For purposes of illustration, assume that the web page status module 38 determines that the rate of change of page views over time exceeds the predetermined threshold for the web page 20-1. The web page status module 38 sets the HV flag 42-1 to designate the web page 20-1 as a HV web page (FIG. 3, step 1008). The web page status module 38 also associates the HV content descriptor 44-1 with the web page 20-1.

It should be noted that the change in number of page views over time is only one example of a calculation for predicting that a respective web page 20 will meet a future viewership metric, and the embodiments are not limited to any particular calculation. For example, in another embodiment, the web page status module 38 analyzes the referring URLs associated with the respective web page 20. Historically, it may be established that if a certain percentage of viewers of the respective web page 20 were referred from a particular web site, the respective web page 20 ultimately met the future viewership metric. The web page status module 38 may determine that the percentage of viewers that are being referred from the particular web site exceeds a predetermined threshold, and the respective web page 20 is thus predicted to meet the future viewership metric.

The client device 12 requests the web page 20-1 from the web server 18 (FIG. 3, step 1010). For example, the user 14 may have entered the URL of the web page 20-1 in the browser module 26 and selected the Enter key. In response, the web server 18 provides the web page 20-1 to the client device 12 (FIG. 3, step 1012). The check web page status module 36 executes and provides the web page ID of the web page 20-1 to the web page status module 38 FIG. 3, (FIG. 3, step 1014). The web page status module 38 accesses the web page entry 40-1 and determines that the web page 20-1 has been flagged as a HV web page. The web page status module 38 obtains the HV content descriptor 44-1 associated with the web page 20-1 (FIG. 3, step 1016). The web page status module 38 sends the HV content descriptor 44-1 to the client device 12 (FIG. 3, step 1018). The client device 12 modifies any instances of the get ad module 46 to utilize the HV content descriptor 44-1 in lieu of the default content descriptor 52 (FIG. 3, step 1020). The get ad module 46 requests an ad from the ad server 50, providing the HV content descriptor 44-1 to the ad server 50 (FIG. 3, step 1022).

The ad server 50, based on the HV content descriptor 44-1, selects the ad 48, and sends the ad 48, or a reference, such as a URL of the ad 48, to the client device 12 (FIG. 3, step 1024). The client device 12 displays the ad 48 in conjunction with the web page 20-1 on the display 28 (FIG. 3, step 1026). As the user 14 views the web page 20-1, the report statistics module 30 provides statistical data regarding aspects of the viewership of the web page 20-1 by the user 14, as discussed above, to the statistics collection module 32 (FIG. 3, step 1028).

Figure 4:
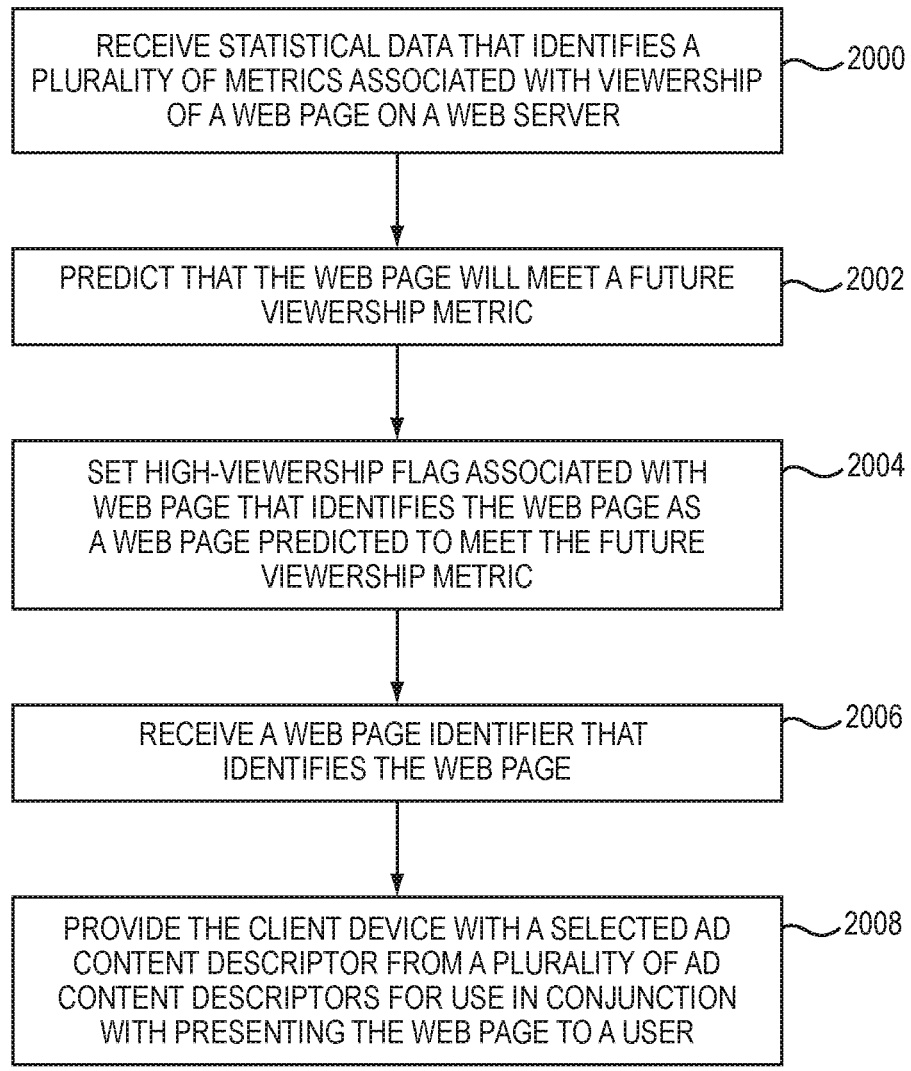
FIG. 4 is a flowchart of a method for dynamically integrating an advertisement with a web page according to one embodiment.

FIG. 4 is a flowchart of a method for dynamically integrating an ad with a web page according to one embodiment. FIG. 4 will be discussed in conjunction with FIG. 1. The web page status module 38 receives statistical data that identifies a plurality of metrics associated with a viewership of the web page 20-1 on the web server 18 (FIG. 4, block 2000). The web page status module 38 predicts that the web page 20-1 will meet a future viewership metric based on the statistical data (FIG. 4, block 2002). The web page status module 38 sets the HV flag 42-1 (FIG. 4, block 2004). The web page status module 38 receives from the client device 12 a web page ID that identifies the web page 20-1 (FIG. 4, block 2006). The web page status module 38 provides the client device 12 with the HV content descriptor 44-1 for use in conjunction with presenting the web page 20-1 to the user 14 (FIG. 4, block 2008).

Figure 5:
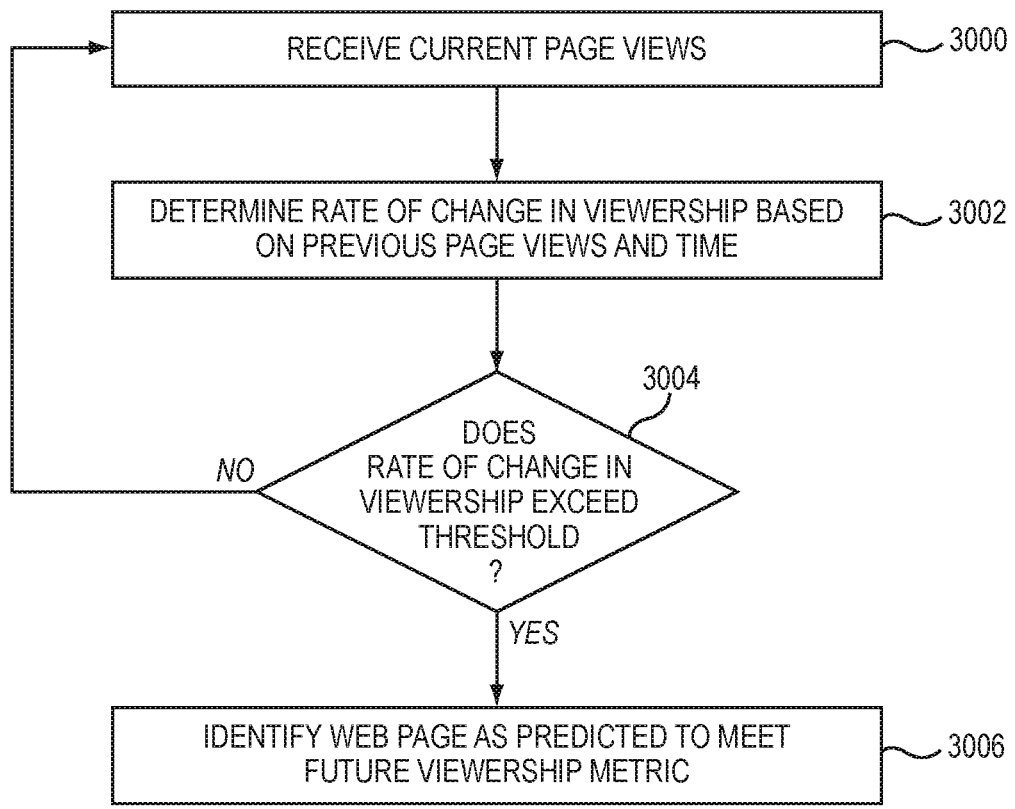
FIG. 5 is a flowchart of a method for determining whether a web page will meet a future viewership metric according to one embodiment.

FIG. 5 is a flowchart of a method for determining whether a web page 20 will meet a future viewership metric according to one embodiment. FIG. 5 will be discussed in conjunction with FIG. 1. At various intervals, the web page status module 38 receives the number of current page views from the statistics collection module 32 (FIG. 5, block 3000). The web page status module 38 determines, based on the number of current page views previously received, a rate of change in viewership over time (FIG. 5, block 3002). The web page status module 38 determines whether the rate of change in viewership exceeds a threshold (FIG. 5, block 3004). If so, then the web page 20 is identified as a web page 20 that is predicted to meet the future viewership criteria (FIG. 5, block 3006). If not, the process returns to block 3000. At the next interval, the most recent number of current page views is received, and the process is repeated.

As an example, assume that the web page status module 38 receives current page view data associated with a web page 20 every 10 minutes from the statistics collection module 32. The web page status module 38 stores the current page view data for each interval to facilitate calculations over time. A current viewership "velocity" is calculated to identify average page views per minute within each sample interval. At each interval, the rate of change in the viewership velocity, i.e., an acceleration, is calculated for multiple time intervals (e.g., 30 minutes) and for longer duration (e.g., 3 hours). Thresholds are defined for individual properties (websites) based on historical performance and analysis of web pages 20 that have spiked previously. Thresholds may be expressed as a function of minimum acceleration over a specified time period. If the acceleration of the web page 20 is greater than any one of several thresholds, the web page 20 is identified as a web page 20 that is predicted to meet the future viewership metric.

The following provides an example calculation:
PVt=page views/minute at current interval
PVn=page views/minute taken at a previous interval
t=time difference between current interval and the previous interval $$Acc=(PVt-PVn)/t$$

[Tn]=array of threshold accelerations and time intervals
Assuming that PVt=1000 page views/min, PV1=600 page views/min,
t=60 min then:

$$Acc=(1000 \text{ page views/min}-600 \text{ page views/min})/60 \text{ min}=\sim 6.7 \text{ page views/min}^2$$

T3=["minAcc"=>6.0 page views/min$^2$, "interval"=>60 min], wherein T3 is one of a plurality of thresholds in an array. Because Acc of about 6.7 page views/min$^2$ is greater than the minimum "minAcc" of 6.0 page views/min$^2$, and "interval" matches the example "t" value of 60 minutes, the web page 20 is identified as a web page 20 that is predicted to meet the future viewership metric.

Figure 6:
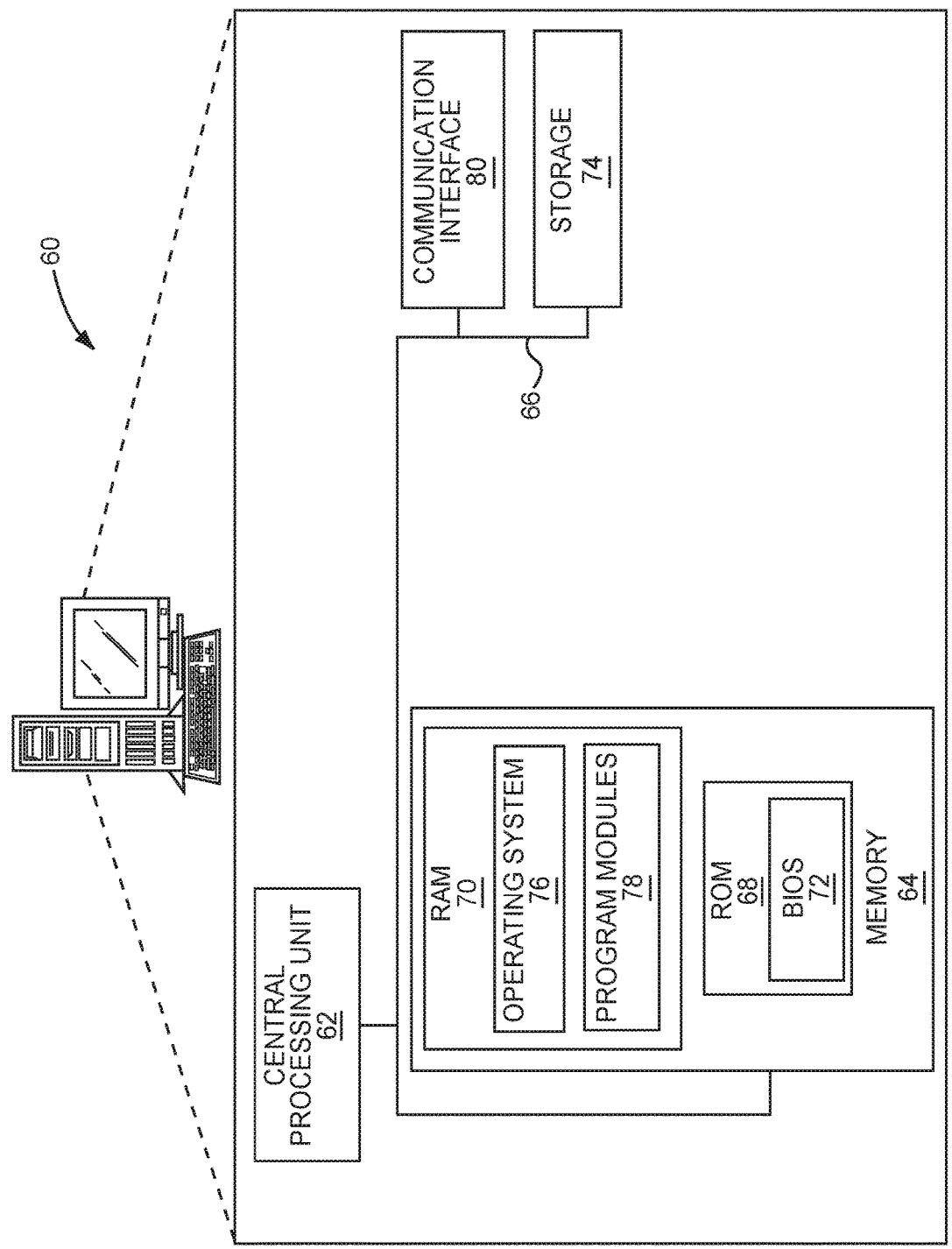
FIG. 6 is a block diagram of a computing device suitable for implementing functionality described herein.

FIG. 6 is a block diagram of a computing device 60 suitable for implementing the functionality of various components discussed herein, including, for example, the web page status module 38, the statistics collection module 32, the ad server 50, or the web server 18. In some embodiments, such components may be implemented on separate computing devices 60. In other embodiments, certain of the components may be implemented on a single computing device 60. For example, in some embodiments, the web page status module 38 and the statistics collection module 32 may be implemented on a single computing device 60. These are merely examples, and the particular implementation of functionality versus individual computing devices may be system and design dependent.

The computing device 60 may comprise any computing or processing device capable of including firmware, hardware, and/or executing software instructions to implement the functionality described herein for the respective component.

For purposes of illustration, the computing device 60 will be discussed in conjunction with implementing the web page status module 38. The computing device 60 includes a central processing unit 62, sometimes referred to as a processor or micro-processor, a system memory 64, and a system bus 66.

The system bus 66 provides an interface for system components including, but not limited to, the system memory 64 and the central processing unit 62. The central processing unit 62 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The system memory 64 may include non-volatile memory 68 (e.g., read only memory (ROM), erasable programmable read only memory (EPROM), electrically erasable programmable read only memory (EEPROM), etc.) and/or volatile memory 70 (e.g., random access memory (RAM)). A basic input/output system (BIOS) 72 may be stored in the non-volatile memory 68, and can include the basic routines that help to transfer information between elements within the computing device 60. The volatile memory 70 may also include a high-speed RAM, such as static RAM for caching data.

The computing device 60 may further include or be coupled to a computer-readable storage 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 74 and other drives, associated with computer-readable media and computer-usable media, may provide non-volatile storage of data, such as the ad information 54, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 74 and in the volatile memory 70, including an operating system 76 and one or more program modules 78, which may implement the functionality described herein in whole or in part, including, for example, the ability to predict the future viewership of a web page based on statistical data associated with viewership of the web page, and any other functionality described herein with regard to the web page status module 38.

All or a portion of the embodiments may be implemented as a computer program product stored on a transitory or non-transitory computer-usable or computer-readable storage medium, such as the computer-readable storage 74, which includes complex programming instructions, such as complex computer-readable program code, configured to cause the central processing unit 62 to carry out the steps described herein. Thus, the computer-readable program code can comprise software instructions for implementing the functionality of the embodiments described herein when executed on the central processing unit 62. The central processing unit 62, in conjunction with the program modules 78 in the volatile memory 70, may serve as a controller, or control system, for the computing device 60 that is configured to, or adapted to, implement the functionality described herein.

The computing device 60 may also include a communication interface 80, suitable for communicating with the network 16 and other networks as appropriate or desired.

The embodiments, among other advantages, more quickly align the viewership of a web page with the appropriate value of providing content, such as ads, in conjunction with the web page.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
   receiving, by a computing device comprising a processor device, statistical data that identifies a plurality of metrics associated with accesses of a first web page of a plurality of web pages on a web server by corresponding accessors;
   based on the statistical data, making, by the computing device, a prediction that the first web page will meet a future access metric, wherein the prediction is based at least in part on an acceleration of a rate of accesses of the first web page by the corresponding accessors;
   based on the prediction, identifying, by the computing device, the first web page as a web page predicted to meet the future access metric;
   receiving, by the computing device from a web browser executing on a client device over a communications network, a request for the first web page;
   sending, to the client device, the first web page, the first web page comprising a default content descriptor, and at least one get content module configured to, when executed by the client device, request additional content to be presented in conjunction with the first web page, the first web page further comprising a module to, when executed by the client device, modify the at least one get content module to utilize a high viewership content descriptor in lieu of or in addition to the default content descriptor;
   receiving, from the web browser executing on the client device, a web page identifier that identifies the first web page as a web page that has been loaded into the web browser on the client device, the web browser sending the web page identifier in conjunction with loading the first web page into the web browser; and
   based on the first web page being identified as a web page predicted to meet the future access metric, providing, via the communications network, to the web browser a content descriptor from a plurality of different content descriptors, the content descriptor being identified as a high viewership content descriptor and identifying additional content to be presented by the web browser in conjunction with presenting the first web page on a display device.

2. The method of claim 1, further comprising setting a high-access flag associated with the first web page that identifies the first web page as a web page predicted to meet the future access metric.

3. The method of claim 1, wherein receiving the statistical data that identifies the plurality of metrics further comprises:
   requesting, by the computing device iteratively over a period of time, the statistical data that identifies the plurality of metrics from a statistics collection resource to generate a plurality of statistical records associated with the first web page.

4. The method of claim 1, wherein the statistical data identifies the plurality of web pages on the web server.

5. The method of claim 1, wherein the plurality of metrics comprises at least two of a rate of change of a content access count metric, a referring URL metric, a geo-location metric, a unique accessor metric, a share magnitude metric, and a client device platform metric.

6. A system comprising:
a computing device comprising:
a communications interface configured to communicate with a communications network; and
a processor coupled to the communications interface, the processor configured to:
receive statistical data that identifies a plurality of metrics associated with accesses of a first web page of a plurality of web pages on a web server by corresponding accessors;
based on the statistical data, make a prediction that the first web page will meet a future access metric, wherein the prediction is based at least in part on an acceleration of a rate of accesses of the first webpage by the corresponding accessors;
based on the prediction, identify the first web page as a web page predicted to meet the future access metric;
receive, from a web browser executing on a client device over the communications network, a request for the first web page;
send, to the client device, the first web page, the first web page comprising a default content descriptor, and at least one get content module configured to, when executed by the client device, request additional content to be presented in conjunction with the first web page, the first web page further comprising a module to, when executed by the client device, modify the at least one get content module to utilize a high viewership content descriptor in lieu of or in addition to the default content descriptor;
receive, from the web browser executing on the client device, a web page identifier that identifies the first web page as a web page that has been loaded into the web browser on the client device, the web browser sending the web page identifier in conjunction with loading the first web page into the web browser; and
based on the first web page being identified as a web page predicted to meet the future access metric, provide, via the communications network, to the web browser a content descriptor from a plurality of different content descriptors, the content descriptor being identified as a high viewership content descriptor and identifying additional content to be presented by the web browser in conjunction with presenting the first web page on a display device.

7. The system of claim 6, wherein to identify the first web page as a web page predicted to meet the future access metric, the processor is further configured to set a high-access flag associated with the first web page.

8. The system of claim 6, wherein the statistical data identifies the plurality of web pages on the web server.

9. The system of claim 6, wherein to make the prediction that the first web page will meet the future access metric, the processor is further configured to:
determine a current interval of time;
determine a current access-per-minute value for the current interval of time;
determine a previous access-per-minute value for a previous interval of time;
determine a time span T that identifies an amount of time between the previous interval of time and the current interval of time;
determine a rate based on a difference between the current access-per-minute value minus the previous access-per-minute value, and divide the difference by the time span T;
access a rate threshold; and
determine that the rate is greater than the rate threshold.

10. The system of claim 6, further comprising:
a statistics collection module, the statistics collection module configured to:
periodically request, from the web server that hosts the first web page, the statistical data associated with the first web page; and
periodically receive, from a plurality of computing devices on which the first web page is presented, the statistical data associated with the first web page.

11. A computer program product stored on a non-transitory computer-readable storage medium and including instructions configured to cause a processor to carry out the steps of:
receiving statistical data that identifies a plurality of metrics associated with accesses of a first web page of a plurality of web pages on a web server by corresponding accessors;
based on the statistical data, making a prediction that the first web page will meet a future access metric, wherein the prediction is based at least in part on an acceleration of a rate of accesses of the first webpage by the corresponding accessors;
based on the prediction, identifying the first web page as a web page predicted to meet the future access metric;
receiving, from a web browser executing on a client device over a communications network, a request for the first web page;
sending, to the client device, the first web page, the first web page comprising a default content descriptor, and at least one get content module configured to, when executed by the client device, request additional content to be presented in conjunction with the first web page, the first web page further comprising a module to, when executed by the client device, modify the at least one get content module to utilize a high viewership content descriptor in lieu of or in addition to the default content descriptor;
receiving, from the web browser executing on the client device, a web page identifier that identifies the first web page as a web page that has been loaded into the web browser on the client device, the web browser sending the web page identifier in conjunction with loading the first web page into the web browser; and
based on the first web page being identified as a web page predicted to meet the future access metric, providing, via the communications network, to the web browser a content descriptor from a plurality of different content descriptors, the content descriptor being identified as a high viewership content descriptor and identifying additional content to be presented by the web browser in conjunction with presenting the first web page on a display device.

12. The computer program product of claim 11, wherein the instructions are further configured to cause the processor to set a high-access flag associated with the first web page to identify the first web page as a web page predicted to meet the future access metric.

13. The computer program product of claim 11, wherein to receive the statistical data that identifies the plurality of metrics, the instructions are further configured to cause the processor to:
 request, iteratively over a period of time, the statistical data that identifies the plurality of metrics from a statistics collection resource to generate a plurality of statistical records associated with the first web page.

\* \* \* \* \*